(12) United States Patent
Conway

(10) Patent No.: US 6,965,597 B1
(45) Date of Patent: Nov. 15, 2005

(54) SYSTEMS AND METHODS FOR AUTOMATIC EVALUATION OF SUBJECTIVE QUALITY OF PACKETIZED TELECOMMUNICATION SIGNALS WHILE VARYING IMPLEMENTATION PARAMETERS

(75) Inventor: Adrian Conway, Weston, MA (US)

(73) Assignee: Verizon Laboratories Inc., Waltham, MA (US)

(*) Notice: Subject to any disclaimer, the term of this patent is extended or adjusted under 35 U.S.C. 154(b) by 754 days.

(21) Appl. No.: 09/971,485

(22) Filed: Oct. 5, 2001

(51) Int. Cl.$^7$ ............................................. H04L 12/56
(52) U.S. Cl. ................................. 370/389; 370/395.21
(58) Field of Search .......................... 370/389, 395.21, 370/395.71; 704/236, 233

(56) References Cited

U.S. PATENT DOCUMENTS

| | | | |
|---|---|---|---|
| 6,289,054 B1 * | 9/2001 | Rhee | 375/240.27 |
| 6,567,471 B1 * | 5/2003 | Yoshinari | 375/240.26 |
| 6,577,996 B1 * | 6/2003 | Jagadeesan | 704/236 |
| 6,609,092 B1 * | 8/2003 | Ghitza et al. | 704/226 |

OTHER PUBLICATIONS

A.D. Clark; "Modeling the Effects of Burst Packet Loss and Recency on Subjective Voice Quality"; IP-Telephony Workshop; Columbia University, New York; Apr. 2001; 5 pages.
J.B. Hopper et al.; "Objective Quality Analysis of a Voice Over Internet Protocol System"; IEE Electronics Letters; vol. 36; No. 22; Oct. 2000; pp. 1900-1901.
L.F. Sun et al., "Impact of Packet Loss Location on Perceived Speech Quality"; 2$^{nd}$ IP-Telephony Worksop; Columbia University, New York; Apr. 2001; 9 pages.
"Testing VoIP using PSQM"; Abacus Application Note 11; Zarak Systems Corporation; Sep. 1999; 8 pages.
A. Conway et al.; "Synchronized Two-Way Voice Simulation Tool for Internet Phone Performance Analysis and Evaluation"; Computer Performance Evaluation Modeling Techniques and Tools, Lecture Notes in Computer Science; vol. 1245; 1997; pp. 108-122.
P. Corriveau et al.; "Video Quality Experts Group: The Quest for Vaild Objective Methods"; In Proceedings SPIE; vol. 3959; Human Vision and Electronic Imaging V; Jun. 2000; pp. 129-139.
P. Denisowski; "How Does It Sound?"; IEEE Spectrum; vol. 38, No. 2; 2001; http://www.spectrum.ieee.org/spectrum/feb01/features/voic.html; 8 pages.
H. Fletcher et al.; "Articulation Testing Methods"; Bell System Technical Journal; vol. 8; 1929; pp. 806-854.
R. Guérin et al.; "Equivalent Capacity and Its Application to Bandwidth Allocation in High-Speed Networks"; IEEE Journal on Selected Areas in Communications; vol. 9, No. 7; 1991; pp. 968-981.

(Continued)

*Primary Examiner*—Man U. Phan
*Assistant Examiner*—Toan Nguyen
(74) *Attorney, Agent, or Firm*—Leonard C. Suchyta, Esq.; Joel Wall, Esq.

(57) ABSTRACT

A system and method automates the process of objectively measuring the subjective quality of packetized telecommunication signals as a function of network quality-of-service (QoS) parameters, implementation choices, and other related parameters. Computer-based simulation may be used in conjunction with objective quality measurement algorithms and pre-recorded reference or test signals. A system (300) employing this simulation method does not require the use of human subjects in subjective quality evaluation. The system and method are applicable to various types of telecommunication signals such as, for example, voice, video, audio, and multimedia.

32 Claims, 6 Drawing Sheets

OTHER PUBLICATIONS

ITU-R Recommendation BS.1387; "Method for Objective Measurements of Perceived Audio Quality (PEAQ)"; 1998; 100 pages.

ITU-T Recommendation P.50; "Artificial Voices"; 1999; 22 pages.

ITU-T Recommendation P.50; Appendix 1; "Test Signals"; 1998; 60 pages.

ITU-T Recommendation P.800; "Methods for Subjective Determination of Transmission Quality"; 1996; 38 pages.

ITU-T Recommendation P.861; "Objective Quality Measurement of Telephone-Band (300-3400 Hz) Speech Codecs"; 1998; 42 pages.

ITU-T Recommendation P.862; "Perceptual Evaluation of Speech Quality (PESQ), an Objective Method for End-to-End Speech Quality Assessment of Narrowband Telephone Networks and Speech Codecs"; 2001; 26 pages.

M. Karam et al.; "Analysis of the Delay and Jitter of Voice Traffic Over the Intenet"; In Proceedings IEEE INFOCOM 2001; vol. 2; 2001; 10 pages.

M. Keyhl et al.; "A Combined Measurement Tool for the Objective Perceptual Based Evaluation of Compressed Speech and Audio Signals"; In Proceedings 106th Audio Engineering Society Convention; 4931 (M3); Munich, Germany; May 1999; pp. 1-22 (plus cover).

T. Kostas et al.; "Real-Time Voice Over Packet-Switched Networks"; IEEE Network; Jan./Feb. 1998; pp. 18-27.

O. Maeshima et al.; "A Method of Service Quality Estimation with a Network Measurement Tool"; In Proceedings IEEE International Performance, Computing and Communcations Conference; Feb. 1999; pp. 201-209.

National Institute of Standards and Technology (NIST) Net Emulator Homepage; www.antd.nist.gov/itg/nistnet/index.html; 4 pages.

M. Perkins et al.; "Characterizing the Subjective Performance of the ITU-T 8 kb/s Speech Coding Algorithm—ITU-T G.729"; IEEE Communications Magazine; vol. 359; Sep. 1997; pp. 74-81.

C. Perkins et al.; "A Survey of Packet-Loss Recovery Techniques for Straming Audio"; IEEE Networks Magazine; vol. 12, No. 5; Sep. 1998; pp. 40-48.

A. Raynes et al.; "Integrated Management Architecture for IP-Based Networks"; IEEE Communications Magazine; vol. 38, No. 4; 2000; pp. 48-53.

A. Rohaly et al.; "Video Quality Experts Group: Current Results and Future Directions"; In Proceedings SPIE; vol. 4067; Visual Communications and Image Processing 2000; May 2000; 12 pages.

L. Thorpe et al.; "Performance of Current Perceptual Objective Speech Quality Measures"; In Proceedings IEEE Workshop on Speech Coding; 1999; pp. 144-146.

ITU Contribution COM 12-20-E, Improvement of the P.861 Perceptual Speech Quality Measure, KPN Research, Netherlands, Dec. 1997, 7 Pages.

* cited by examiner

SYSTEMS AND METHODS FOR AUTOMATIC EVALUATION OF SUBJECTIVE QUALITY OF PACKETIZED TELECOMMUNICATION SIGNALS WHILE VARYING IMPLEMENTATION PARAMETERS

BACKGROUND OF THE INVENTION

1. Field of the Invention

The present invention relates generally to telecommunications and, more particularly, to evaluating the subjective quality of packetized signals.

2. Description of Related Art

Packet-switched communication networks are being used increasingly for transporting real-time interactive telecommunication signals such as telephony, video telephony, multimedia communication, teleconferencing, and multimedia teleconferencing. Such packet-switched networks are also being used increasingly for distributing and delivering static stored content and live content such as, for example, video clips, live video, movies, audio, music, and radio. A fundamental difficulty in supporting transmission of these types of signals is ensuring that signal quality, as perceived by end-users, is at required levels. To achieve this signal quality at the end user device, the packet-switched network should be designed to provide required subjective quality levels. Mechanisms should also be in place to ensure that required quality levels are maintained on an ongoing basis.

To engineer a packet-switched network that meets required quality levels in the telecommunication signals mentioned above, it is necessary to determine and understand how subjective quality depends on various combinations of network-level quality-of-service (QoS) parameters, type of coder/decoder (codec), packetization method, buffering mechanism, play-out algorithm, and other related parameters. QoS parameters may characterize the performance of the transport service provided by a network. For example, QoS parameters may include packet loss percentage, packet delay, and packet delay jitter.

FIG. 1 illustrates one approach that has been proposed, namely building a test telecommunications network 110 in a laboratory environment 100 and evaluating signal quality directly using human subjects 120. A difficulty with this approach is the expense and time associated with using human subjects, especially when there are many different experiments (e.g., combinations of the network parameters listed above) to be carried out. Constructing and operating test network 110 in lab environment 100 can also be expensive. It may also be time-consuming and expensive to modify test network 110 for different experiments. Another difficulty with the approach illustrated in FIG. 1 is that experimental results generally are not reproducible, because subjective evaluation is carried out using real human subjects 120 whose opinions of signal quality may vary with repetitions of the same experiment.

FIG. 2 illustrates another approach that has been proposed, namely using test equipment 210 that applies objective methods to measure quality of signals from test network 110 in laboratory environment 100. In contrast to using human subjects 120, the objective measurement scheme in FIG. 2 applies a machine-executable algorithm within equipment 210 to determine the quality of a received signal as compared to an original transmitted signal.

An example of an objective method is objective quality measurement based on Perceptual Speech Quality Measure (PSQM). PSQM is a computation-based method to objectively measure perceived quality of a speech signal, and is specified in the International Telecommunication Union-Telecommunication (ITU-T) P.861 recommendation. This PSQM method was originally developed for evaluating subjective quality of speech codecs, but it is now also being applied to objectively measure voice-call quality across packet-switched networks. Examples of commercially available test equipment that use PSQM include the Abacus™ system from Zarak Systems Corporation, the VoIP Test System™ from Hammer Technologies, and the 935AT Telecom Test Set™ from Sage Instruments. Although objective signal quality measurement equipment may be used to replace human subjects in evaluating signal quality, applying such an approach to test network 110 in lab environment 100 can still be time consuming and expensive when there are many experiments to be carried out.

Thus, there is a need in the art to subjectively measure signal quality over a packet-switched network having variable parameters in a quick and inexpensive manner.

SUMMARY OF THE INVENTION

Devices and processes consistent with the principles of the invention may, among other things, efficiently measure subjective signal quality over a packet-switched network.

One aspect of the present invention is directed to a method of automatically determining subjective quality of signals transmitted over a packet-switched network, which may include transmitting input signals to a model of the packet-switched network and altering the transmitted input signals using the model of the packet-switched network, the altered signals representing results of transmitting the input signals through the packet-switched network. The altered signals may be modified to obtain output signals. An objective quality of the output signals may be measured based on the input signals, and the objective quality may be transformed to a subjective measure of quality.

A second aspect of the present invention is directed to a method of automatically determining a subjective quality of voice signals transmitted over a packet-switched network, which may include encoding and streaming input voice signals. A packet-switched network model may perturb the streamed input signals to obtain perturbed voice signals, which may be buffered and decoded to obtain output voice signals. The method may automatically determine a subjective measure of quality of the output voice signals based on the input voice signals.

Yet another aspect consistent with principles of the present invention is directed to a computer-readable medium that stores instructions executable by one or more processors to perform a method for automatically determining a subjective quality of received signals, which may include instructions for encoding an input signal to produce an encoded signal and instructions for packetizing the encoded signal to produce a packetized signal. The medium may also include instructions for streaming the packetized signal to produce a streamed signal and instructions for performing a discrete event simulation of a network on the streamed signal to produce an output signal. Other instructions may be present for buffering the output signal to produce a packetized output signal. Likewise, further instructions may depacketize the packetized output signal to produce an encoded output signal, and may decode the encoded output signal to produce a received signal. The medium may include instructions for producing an objective quality measurement of the received signal using an objective quality measurement algorithm and the input signal. Still other instructions may transform the objective quality measurement of the received signal into a subjective quality score for the received signal.

Still another aspect consistent with the present invention may include a computer-readable medium that stores instructions executable by one or more processors that constitute a simulation engine for automatically determining a subjective quality of received signals, including instructions for transmitting an input signal to a network model and instructions for perturbing the transmitted signal by the network model. The computer-readable medium may also include instructions for receiving the perturbed signal from the network model and instructions for producing a subjective measure of quality from the received signal and the input signal. Other instructions may change parameters in the instructions for transmitting, the instructions for perturbing, and the instructions for receiving.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, in one implementation, a simulated network perturbs an input signal that has been encoded and packetized. After depacketization and decoding, an objective quality measurement algorithm produces an objective quality measure for the resulting signal. The objective quality measure may be transformed into a subjective quality score for the network-perturbed signal by another algorithm.

General System Description

Figure 1:
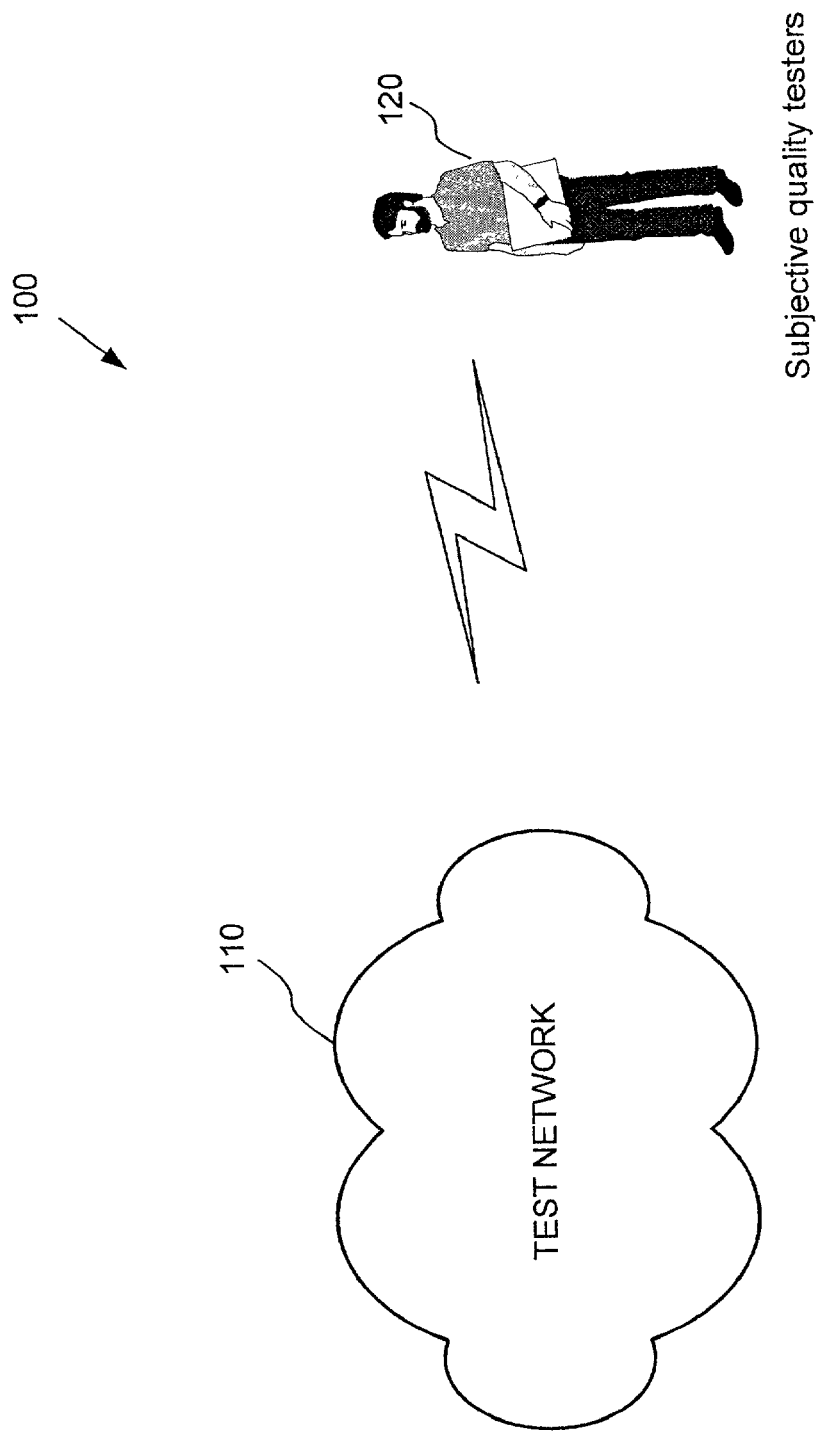
FIG. 1 is a diagram illustrating an exemplary laboratory test environment including a test network and human quality testers.
Figure 2:
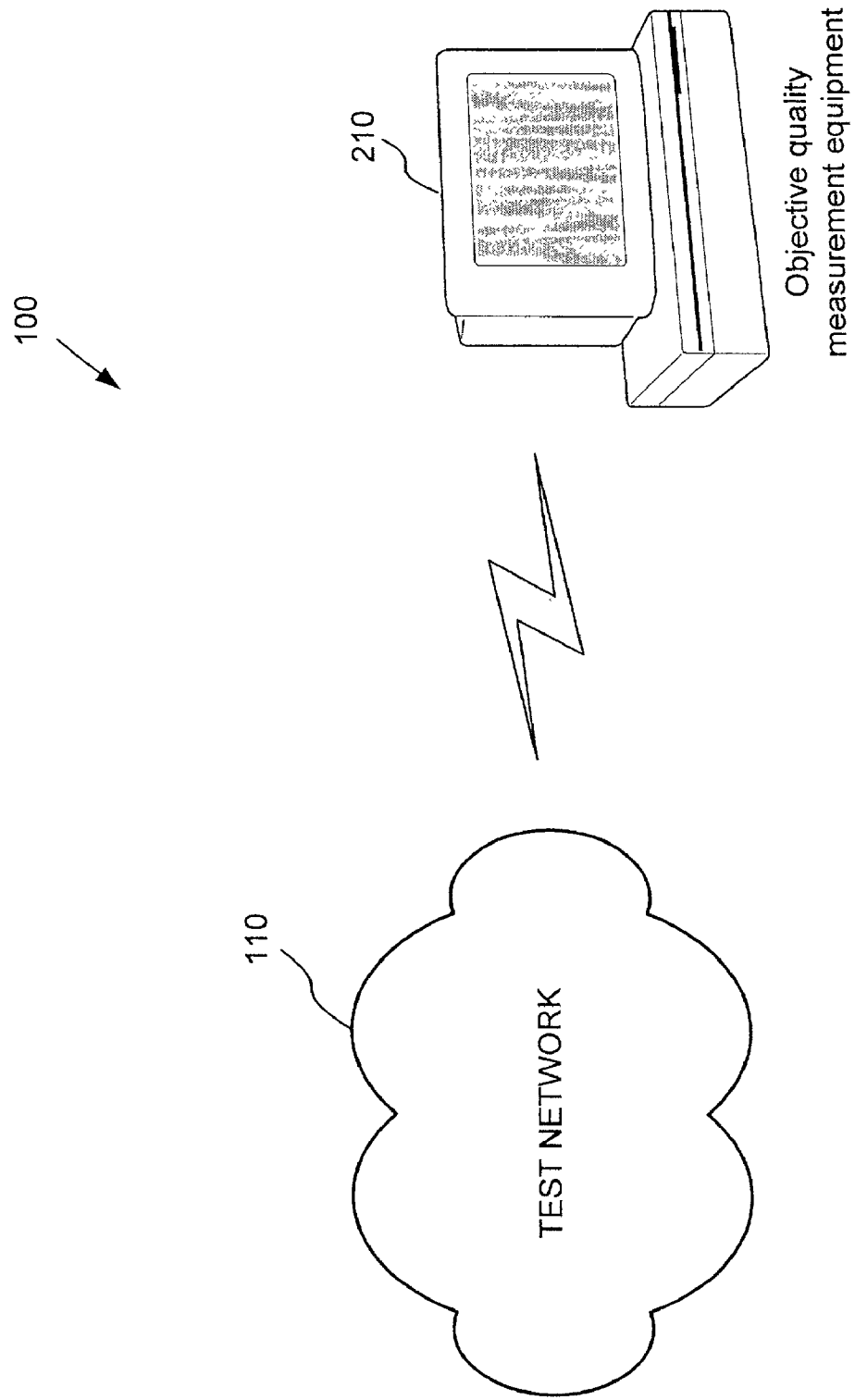
FIG. 2 is a diagram illustrating the exemplary laboratory test environment of FIG. 1 including the test network and quality measurement equipment.
Figure 3A:
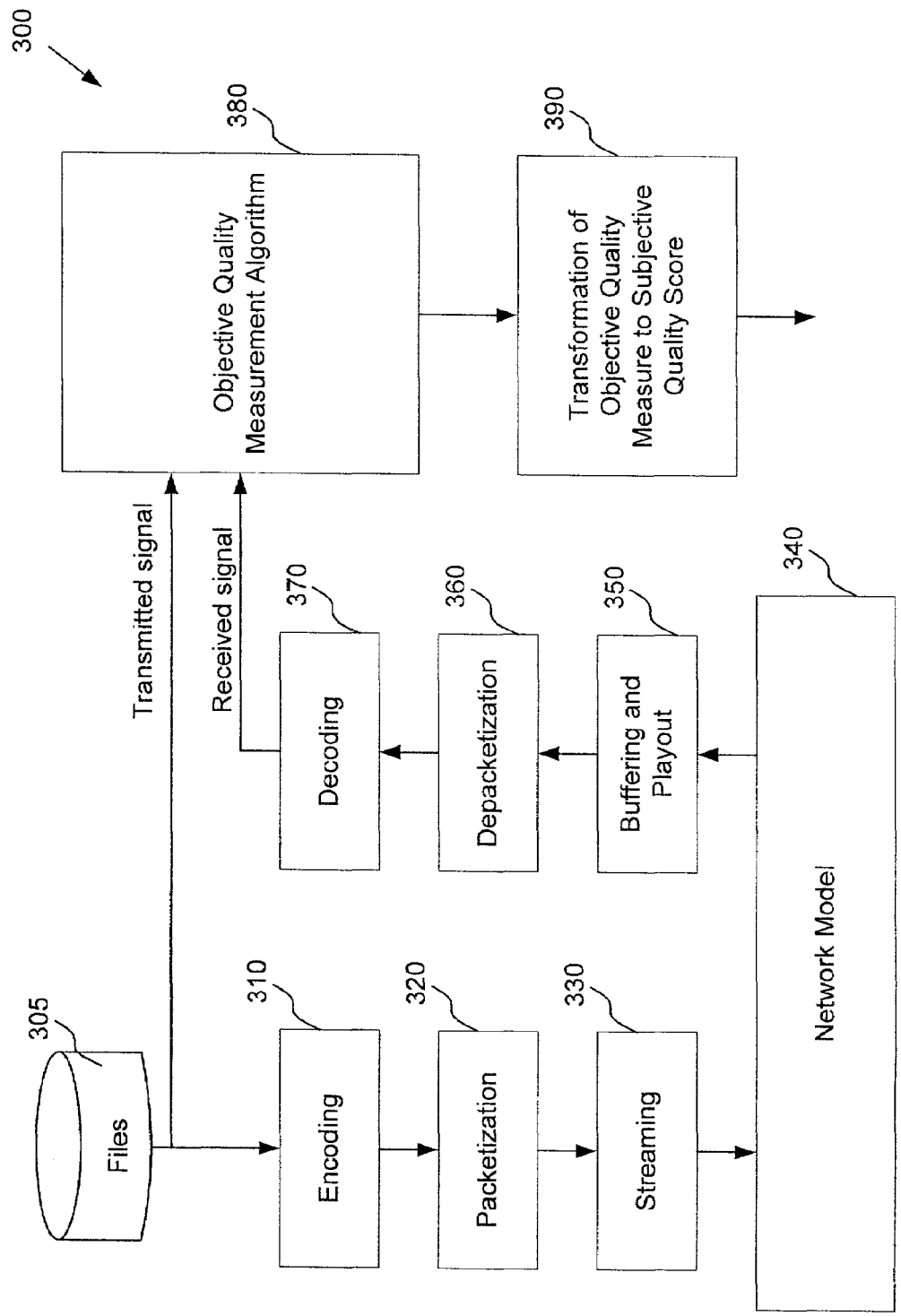
FIG. 3A is a block diagram illustrating conceptual operation of a general simulation engine configured to simulate a network and to perform subjective quality measurement on signals transmitted through the network according to an implementation consistent with the present invention.
Figure 3B:
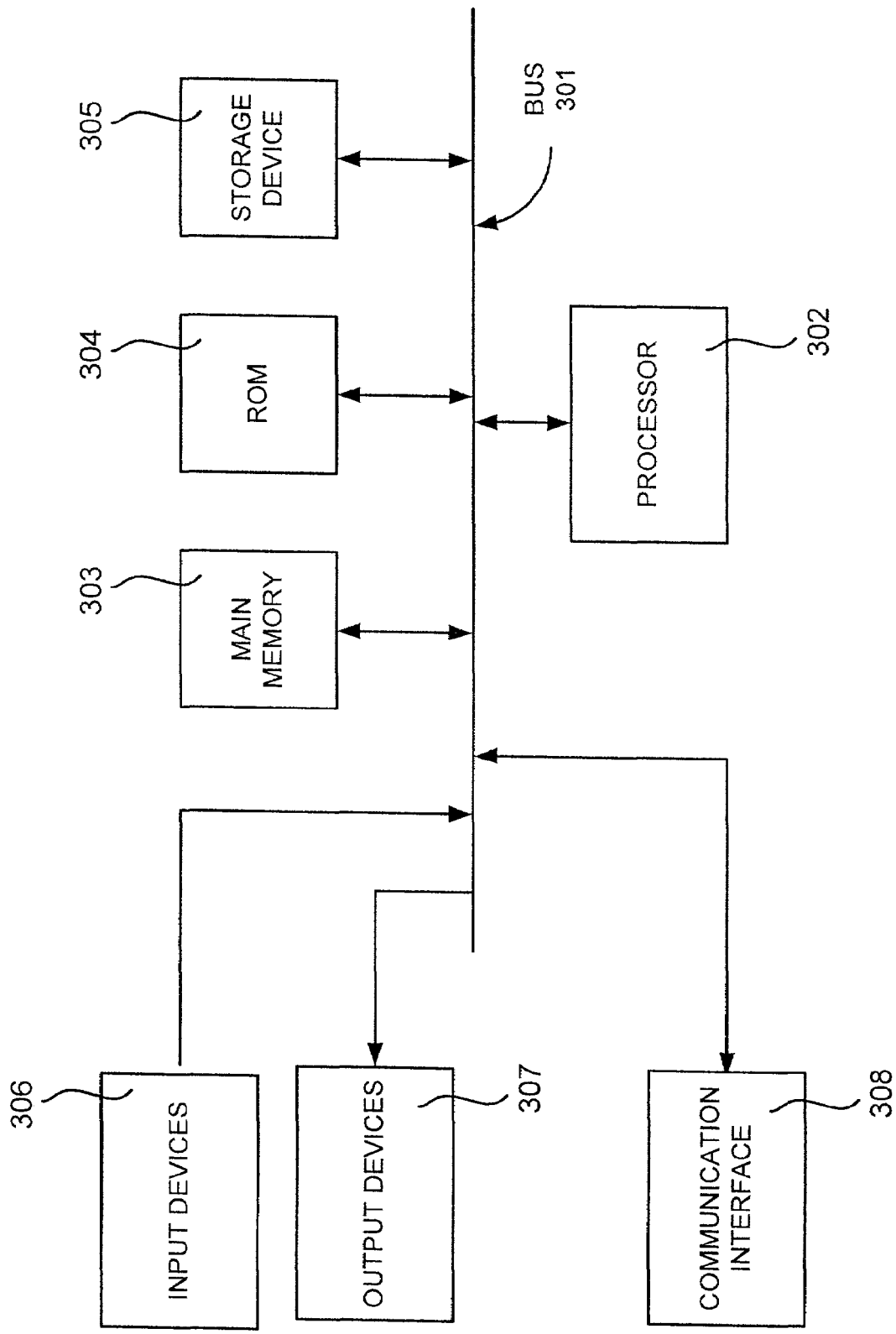
FIG. 3B is an exemplary diagram of a general purpose computer in which the simulation engine of FIG. 3A may be implemented.

FIG. 3A is a block diagram illustrating operation of a simulation engine 300 configured to simulate a network and to perform subjective quality measurement on signals transmitted through the network according to an implementation consistent with the present invention. Simulation engine 300 may include any type of conventional processor or microprocessor that interprets and executes instructions. Simulation engine 300 also may include an associated static or dynamic memory that stores information and instructions for execution by the processor. The associated memory may include a random access memory (RAM), a read-only memory (ROM), or a magnetic and/or optical recording medium and its corresponding drive. FIG. 3B is an exemplary diagram of a general purpose computer in which simulation engine 300 may be implemented. The computer may include a bus 301, a processor 302, a main memory 303, a read only memory (ROM) 304, a storage device 305, one or more input devices 306, one or more output devices 307, and a communication interface 308. Bus 301 may include one or more conductors that permit communication among the components of the computer.

Processor 302 may include any type of conventional processor or microprocessor that interprets and executes instructions. Main memory 303 may include a random access memory (RAM) or another dynamic storage device that stores information and instructions for execution by processor 302. The ROM 304 may include a conventional ROM device or another type of static storage device that stores static information and instructions for use by processor 302. Storage device 305 may include a magnetic and/or optical recording medium and its corresponding drive.

Returning to FIG. 3A, simulation engine 300 includes storage device 305 for storing files. Alternately, one or more of main memory 303 and ROM 304 may be used to store the files. Simulation engine 300 may also include an encoding block 310, a packetization block 320, a streaming block 330, a network model block 340, a buffering and playout block 350, a depacketization block 360, a decoding block 370, an objective quality measurement algorithm 380, and a transformation of objective measure to subjective quality score block 390. Blocks 310–390 may be discrete computer program segments or executable codes, or they may be portions of one or more larger computer programs. FIG. 3A illustrates an exemplary configuration and flow of data from storage device 305 through blocks 310–390. It should be understood that other configurations may be used.

Storage device 305 may contain files representing stored telecommunication signals. The telecommunication signals in storage device 305 are not restricted to any particular type of signal, and may include signal types such as voice audio, video, other audio, and multimedia signals. As used herein, "multimedia" may include any combination of text, graphics, video, animation, and sound. In one implementation, telecommunication signals in storage device 305 are reference signals developed for a particular type of signal (e.g., voice) by a standards-setting body, such as the International Telecommunication Union (TFU). For example, ITU-Telecommunication section (ITU-T) recommendation P.50 describes a procedure to generate artificial speech that matches certain time and frequency domain characteristics of real speech. In an exemplary implementation, a corresponding objective quality measurement method may be available for telecommunication signals in storage device 305.

Encoding block 310 may convert an analog or digital telecommunication signal from storage device 305 into a digital signal that exhibits desirable properties, such as reduced bandwidth or robustness to noise. Preferably, the encoding performed by encoding block 310 matches the encoding performed (e.g., type of codec) in a network whose performance is to be evaluated. Examples of types of encoding performed by encoding block 310 may include the ITU-T G.711 standard for encoding telephone audio on a 64 kbit/s channel. For example, a coding technique for G.711 is pulse code modulation (PCM). Another example of an encoding type is the ITU-T G.729 standard for encoding telephone audio on an 8 kbit/s channel. An exemplary coding technique for G.729 is algebraic code-excited linear prediction (ACELP). Other types of signal encoding will be known to those skilled in the art.

Packetization block 320 may segment the digitally encoded signal from encoding block 310 into data frames (i.e., time-contiguous portions of a digital signal) and place the frames in payloads of data packets. Each packet may include a header and a payload field. Preferably, packetization performed by packetization block 320 matches packetization performed in a network whose performance is to be evaluated. One exemplary type of packetization results in real-time transport protocol (RTP) packets, as specified in request for comments (RFC) 1889 of the Internet Engineering Task Force (ETF). The RTP protocol defines the format of the header of an RTP packet. The RTP protocol also provides end-to-end network transport functions suitable for applications transmitting real-time data, such as audio and video, over multicast or unicast network services. Other types of packetization will be known to those skilled in the art.

Streaming block 330 may be configured to continuously transmit a sequence of packets from packetization block 320 at a fixed packet rate. Alternately, streaming block 330 may construct a data file representing such a stream of packets. Typically, the packets are transmitted in a datagram fashion without having to wait for any acknowledgment packets. Preferably, the streaming performed by streaming block 330 matches the streaming performed in a network whose performance is to be evaluated.

Network model 340 may include a discrete-event simulation model implemented in software. The simulation model may be a simplified logical abstraction of a real network. The simulation model may be, for example, a QoS-type model that includes packet loss and packet delay, or it may be a simple first-in first-out (FFO) queue model for an access link. Network model 340 may introduce simulated QoS impairments into the transmitted packet stream. Such impairments may take the form of, for example, packet loss, packet delay jitter, and signal degradation effects such as echoes. The QoS impairments may themselves be generated according to another model. Also, network model 340 may itself be a simulated network that contains simulated background packet traffic. Network model 340 may be configured so that different QoS impairments may be selected via software control. In summary, network model 340 may be configured in any number of ways. In each case, however, network model 340 is designed to receive input signals, simulate actual network conditions and phenomena with respect to how the input signals are altered within the network, and to output the resultant, altered signals.

The resultant signals that are output from network model 340 may also be said to have been "perturbed" by the network model 340. As used herein, "perturbing" refers to the changing, disturbing, or altering of an input signal by, for example, signal impairment or degradation effects within network model 340.

Buffering and playout block 350 may be configured to store received packets in a packet buffer upon arrival from network model 340. The buffering and playout block 350 passes the packets on (i.e., plays them out) to depacketization block 360 and subsequent decoding block 370. Depacketization block 360 may be configured to extract the digital data frames (carried in the packet payload) from a packet prior to presenting the data frames to decoding block 370.

Decoding block 370 may be configured to perform the reverse of the encoding process performed by the encoding block 310. Such decoding recovers the original telecommunication signal from the received encoded digital signal by using the same codec type used by encoding block 310.

The objective quality measurement algorithm 380 is a machine-executable algorithm that receives an original reference signal from storage device 305 and compares it to a received signal that has passed through network model 340. Objective quality measurement algorithm 380 provides a measure of the quality of the network-perturbed signal as compared to the original. The measure of quality is objective in the sense that the measurement (or assessment) of quality does not involve any human subjects. In addition to the aforementioned PSQM method, the Perceived Audio Quality (PEAQ) method is another example of an algorithm that can be used as the objective quality measurement algorithm 380. The PEAQ method is specified in the ITU Radiocommunication Sector (ITU-R) Recommendation BS.1387, and is another machine-executable method for objective measurement of perceived audio quality. Another example of a suitable algorithm for objective quality measurement algorithm 380 is the Perceptual Evaluation of Speech Quality (PESQ), which is a machine-executable objective method for speech quality assessment. PESQ is an improved method relative to PSQM, and is specified in ITU-T Recommendation P.862. Those skilled in the art will appreciate, in view of this disclosure, that other types of presently known or later developed quality measurement algorithms may be used in the objective quality measurement algorithm block 380 to objectively measure other types of signals, such as video.

The transformation of objective measure to subjective score block 390 may map an objective quality value from Objective Quality Measurement algorithm block 380 to a subjective quality score. The objective quality values provided by the objective quality measurement algorithm 380 may not necessarily correlate well with subjective scores that would be obtained using human subjects. The transformation from objective values to subjective quality score may be a mapping that provides subjective scores that correlate well with what would be obtained using human subjects. One exemplary subjective score is a mean opinion score (MOS). The MOS scale uses grades from bad to excellent that are specified in the Absolute Category Rating (ACR) method of ITU-T P.800.

Simulation engine 300 in FIG. 3 may accommodate different codec types in encoding and decoding blocks 310/370, different packetization methods in packetization/depacketization blocks 320/360, and different buffering and playout schemes in streaming and playout blocks 330/350. Simulation engine 300 may also accommodate different network models 340 and different network QoS impairment models within these network models. Also, simulation engine 300 may incorporate new, improved, or revised, objective quality measurement algorithms 380 as they become available. It may also include the effects of echoes by incorporating a return path (not shown) from decoding block 370 to encoding block 310. These various parameters may be varied under software control by a control algorithm (not shown) to effect in a timely manner numerous tests on potentially large numbers of signals and types of signals.

Voice Over Ip Example

Figure 4:
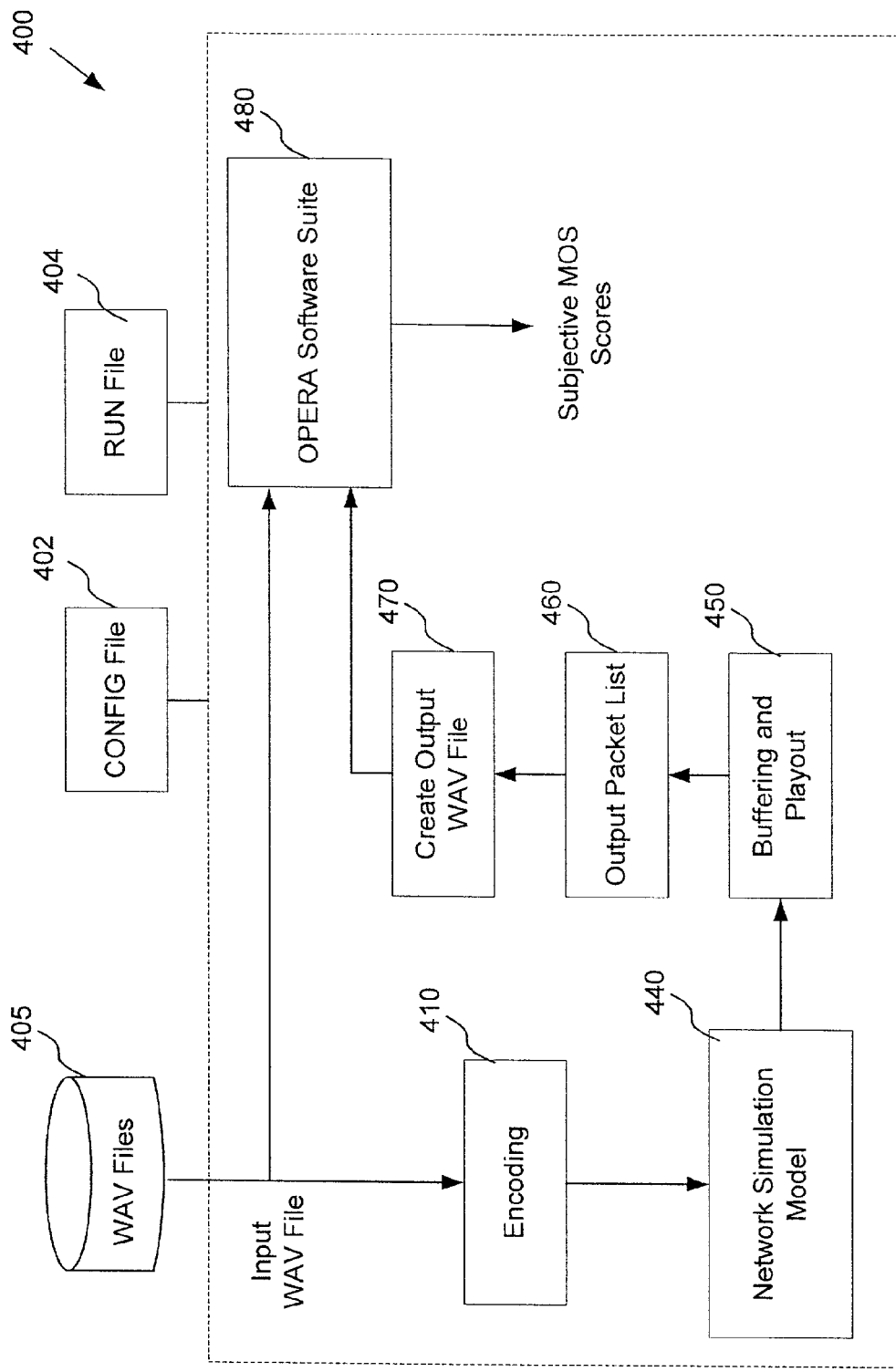
FIG. 4 is an exemplary block diagram illustrating conceptual operation of a general simulation engine configured to simulate an Internet Protocol (IP) network and to perform subjective quality measurement on voice signals transmitted through the IP network according to an implementation consistent with the present invention.

FIG. 4 is an exemplary block diagram illustrating conceptual operation of a general simulation engine 400 configured to simulate an IP network and to perform subjective quality measurement on voice signals transmitted therethrough. FIG. 4 may be conceptualized as a voice over IP (VoIP) example of the general simulation engine 300 shown in FIG. 3. VoIP simulation engine 400 includes a configuration file 402, a run file 404, a number of WAV files 405, an encoding block 410, a network simulation model block 440, a buffering and playout block 450, an output packet list block 460, a WAV file creation block 470, and an OPERA™ software suite 480. Files 402, 404, and 405 may be stored in a memory. The blocks 410 and 440–480 may be discrete computer program segments or executable codes, or they may be portions of one or more larger computer programs. Processing associated with these blocks (shown inside a dashed box) may be performed by a general-purpose processor (e.g., a personal computer running a version of the Windows™ operating system). The files 402, 404, and 405 and blocks 410 and 440–480 may be connected as shown in FIG. 4.

WAV-type files 405 may include reference voice signal input files. These WAV files 405 may be constructed from raw 16-bit 16-kHz sampled voice signal files that are available, for example, from the ITU-T. The voice signals include the reference artificial voice signal P.50, as well as reference voice signals in various different languages for both male and female speakers. The ITU reference voice signals are each of relatively short duration. For example, the P.50 signal is only about 11 seconds long and the English female signal is only about 12 seconds long. In order to run network QoS simulations for a sufficient length of time to obtain 'equilibrium' results, longer WAV files 405 may be constructed by concatenating copies of the same shorter reference file.

Configuration file 402 may specify all fixed parameters in running simulation engine 400 for a set of experiments. Run file 404 may specify, for example, different individual experiments that are to be run. Each individual experiment is distinguished by a particular set of parameter combinations for simulation engine 400.

Encoding block 410 may be configured to create and store the input packet list that is to be transmitted or 'streamed' to the network. The construction of the packet list takes into account the voice encoding algorithm (i.e., codec) to be used, the amount of voice data to be placed in each packet, and the type of packet (e.g. RTP/user datagram protocol (UDP)/IP) to be streamed. Relative timestamps and sequence numbers may be placed in each packet by encoding block 410.

Network simulation model 440 may include a discrete-event network simulation that is driven by the previously constructed VoIP input packet stream. Network simulation model 440 may include the modeling of network QoS impairments such as packet loss and packet delay jitter. The network modeling and the QoS modeling may take many forms, varying in complexity and simulation accuracy. For simplicity of explanation, however, only three models will be described: (i) a Bernoulli loss model, (ii) a bursty loss model, and (iii) a delay jitter model that also includes Bernoulli loss. In the Bernoulli loss model, packets are simply discarded at random. In the bursty loss model, the start of a packet burst is determined according to a Bernoulli trial, and the burst length is assumed to be Poisson distributed. The delay jitter model may include a single FIFO queue with the VoIP traffic stream multiplexed in with other background traffic that is assumed to arrive according to a Poisson process. The background traffic packet lengths are assumed to be Poisson distributed. The effect of the background traffic in this third model is to introduce delay jitter into the VoIP packet stream.

The output of network simulation model 440 is a stream of VoIP packets. These packets may be timestamped with their exit time. The effect of network model 440 is to perturb the original input packet stream. Exemplary network perturbations include packet loss, out-of-sequence packets, duplicated packets, and delay jitter. At the output end of network simulation model 440, the output VoIP stream is fed into a simulated fixed-length packet buffer 450. The packets may be played out from the buffer 450 according to a play-out algorithm, which is also part of block 450. The coded voice data may then be extracted from the payloads of the played-out packets and then decoded according to the codec algorithm that is being employed by output packet list block 460. The voice data associated with a lost packet may be set to a period of silence. Alternately, other known methods of repairing packet loss may be used.

WAV file creation block 470 may arrange the decoded voice signal data from output packet list block 460 to form an output WAV file. This file contains the final received output voice signal.

The OPERA™ software suite 480 may include OPERA™ Software Suite Version 2.0 or Version 3.0 that is available from Opticom GmbH. OPERA software suite 480 may be run in a batch file mode with the input and final received WAV files as inputs. The OPERA™ software suite 480 may utilize the included PSQM and PSQM+ algorithm implementations. The PSQM+ algorithm is an improved version of PSQM that is more suitable for VoIP network measurements than the standardized PSQM method. PSQM+ improves the time-alignment of the signals to be compared and also improves how silence periods and packet dropouts are taken into account in evaluating subjective quality. PSQM+ was developed by the original developers of PSQM (KPN Research of the Netherlands), but PSQM+ is not currently an ITU-T recommendation.

In a single run, OPERA software suite 480 may provide three different scores for PSQM and one score for PSQM+. The three PSQM scores correspond to different assumed values of a silent interval weighting factor $W_{sil}$ that enters into the computation of the PSQM score as defined in ITU-T P.861. The three assumed values for $W_{sil}$ are 0.0, 0.2, and 0.4. In ITU-T P.861, a provisional recommendation of $W_{sil}=0.2$ is made for speech with about 50% silent intervals. The computation of the PSQM+ score does not involve the silent interval weighting factor $W_{sil}$.

The OPERA™ software suite 480 also maps the computed PSQM and PSQM+ output values to an objective mean opinion score (OMOS) scale. This scale, shown in Table 1, uses the following grades of MOS that are found in the Absolute Category Rating (ACR) method of ITU-T P.800.

TABLE 1

| Objective Mean Opinion Score | |
|---|---|
| 5 | Excellent |
| 4 | Good |
| 3 | Fair |
| 2 | Poor |
| 1 | Bad |

With the above scale, it has been found using real subjective testing of 'toll-grade' (i.e., high quality that is typically associated with a 64 Kb/s pulse code modulated (PCM) codec) voice calls that the OMOS score does not exceed 4.3. A value of OMOS=4 is normally considered toll quality. Hence, in analyzing VoIP quality, the OMOS score will usually fall in the range of 1 to 4. The actual functions used in OPERA™ to map the PSQM and PSQM+ values to the OMOS scores have been found to provide good correlation with real subjective results. Any difficulty in having to deal with such proprietary OMOS mapping functions will disappear with the adoption of the improved ITU-T PESQ method.

Alternatively, PSQM and PSQM+output values from OPERA™ software suite 480 may be correlated to actual subjective quality values, and a regression or other analysis performed, to obtain a heuristic function for mapping objective scores to subjective scores.

The VoIP simulation engine 400 may be extended to include the improved and recently standardized ITU-T P.862 PESQ method, the software for which has just recently become available in the OPERA™ Software Suite Version 3.0. Encoding block 410 and WAV file creation block 470 also may include additional codecs such as ITU-T G.729. Although previously alluded to, network simulation model 440 may include a wider variety of network QoS models and associated parameters, as well as different methods of repairing packet loss.

The VoIP simulation engine 400 enables the time-efficient and cost-effective evaluation of VoIP subjective quality as a function of network QoS conditions, implementation choices, and configuration settings. As a flexible automated simulation-based tool employing standardized reference voice signals and standardized methods of objective voice quality measurement, simulation engine 400 provides a practical alternative to the costly and time-consuming process of testing in a lab environment with real human subjects and expensive equipment.

Another application area for VoIP simulation engine 400 is in the development of 'subjective teletraffic engineering' rules and methods for VoIP. Traditionally, teletraffic engineering for packet networks is developed in terms of mathematically-oriented performance requirements such as packet loss, packet delay, and packet delay jitter. These requirements, however, may not translate directly into the subjective quality levels that are to be perceived by the end-users. The subjective analysis of voice quality performed by VoIP simulation engine 400 may now provide a vehicle for developing teletraffic engineering methods for VoIP that are based directly on objective MOS requirements. As an example, VoIP simulation engine 400 may be applied to the study of an access link over which multiple VoIP calls are multiplexed. VoIP simulation engine 400 may be used to determine in an automated way how many VoIP calls may be multiplexed subject to specific objective MOS requirements. In this way, VoIP teletraffic engineering rules and methods may be developed based directly on objective MOS requirements.

System Operation

Figure 5:
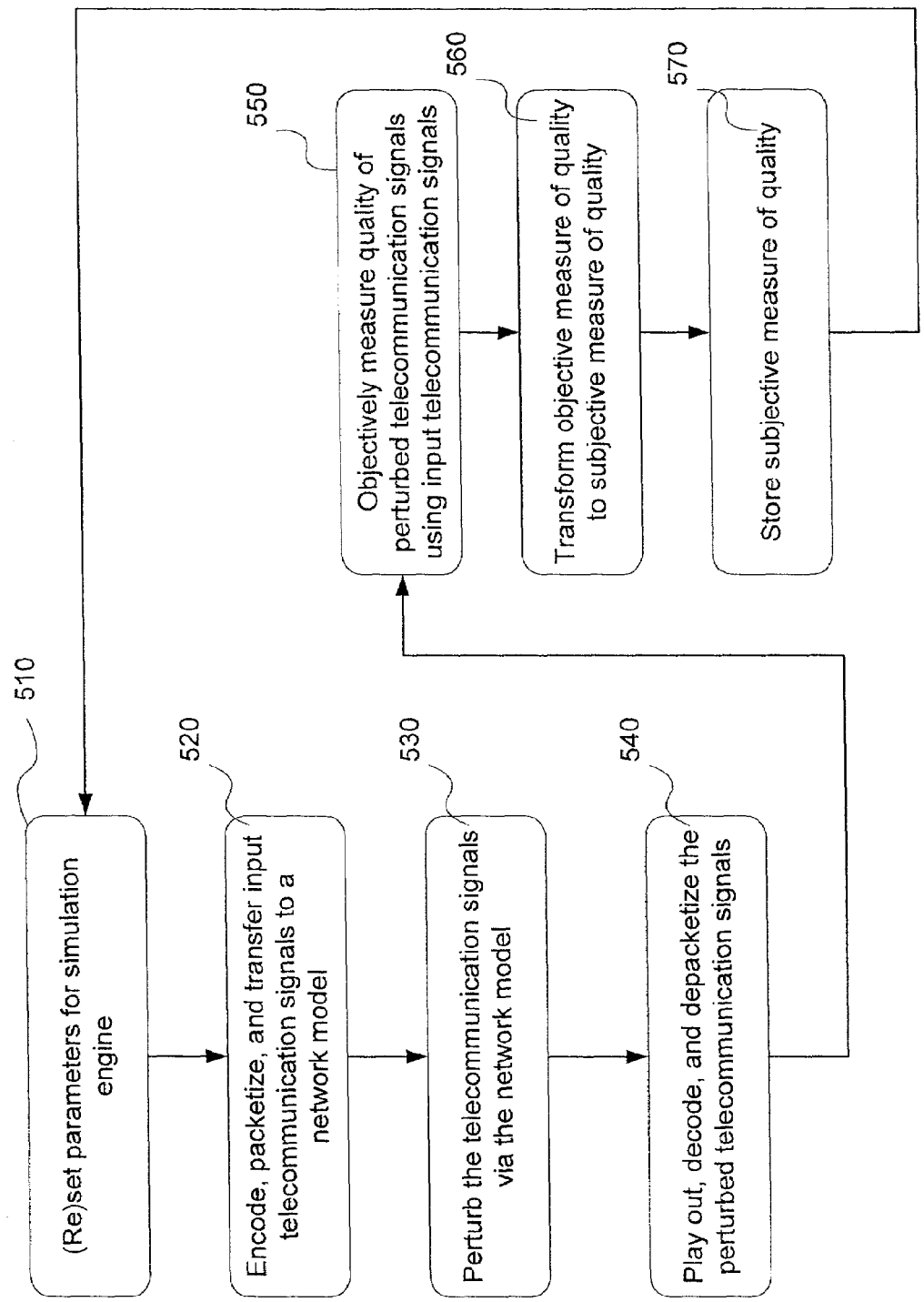
FIG. 5 is a flow chart illustrating exemplary processing performed by the simulation engines of FIGS. 3 and 4 according to an implementation consistent with the present invention.

FIG. 5 is a flow chart illustrating exemplary processing performed by either of the simulation engines 300 and 400. For ease of explanation, the processing will be described primarily with respect to simulation engine 300 of FIG. 3. Processing may begin with a configuration file (e.g., config file 402) loading applicable parameters into one or more of encoding block 310, packetization block 320, streaming block 330, network model block 340, buffering and playout block 350, depacketization block 360, decoding block 370, objective quality measurement algorithm 380, and transformation of objective measure to subjective score block 390 [step 510]. The parameters represent, for example, network conditions and impairments, encoding and decoding techniques used, etc.

Encoding block 310, packetization block 320, and streaming block 330 may encode and prepare an input signal from storage device 305 for input into the network model block 340 [step 520]. Network model block 340 may then perturb the input signal based on parameters within the network model that were set by the configuration file [step 530].

Buffering and playout block 350, depacketization block 360, and decoding block 370 may play out, depacketize, and decode the perturbed signal from the network model [step 540]. Next, objective quality measurement algorithm 380 may operate on the perturbed signals and on the input signals from storage device 305 to produce an objective measure of quality [step 550]. The transformation of objective measure to subjective score block 390 may transform the objective measure to a subjective quality metric, such as a MOS [step 560]. The subjective quality metric may them be stored for later use [step 570].

If there are additional experiments to be carried out, processing may return to step 510 for loading of different simulation engine parameters from the configuration file. In this manner, many experiments, each generating subjective quality measurements, may be rapidly and inexpensively performed.

Implementations consistent with the present invention advantageously do not require the use of any human subjects to conduct subjective signal quality testing. Also, the process of conducting multiple tests with different parameter settings may be automated under software control. Such automation of testing enables one to conduct subjective quality testing in a timely and cost effective manner for large sets of experiments.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, the general methodology presented in FIGS. 3, 4, and 5 is not restricted to only voice signals. It may also be applied to other telecommunication signal types, such as audio and video, subject to the condition that a corresponding objective quality measurement method is available. For example, the methodology may be applied to packetized audio signals that are streamed across a packet network since the standardized PEAQ method is currently available. In the near future, the proposed methodology may also be applied to packetized video signals, because work on developing objective quality measurement methods for video is already well underway. One may also apply the methodology to multimedia signals that are combinations of voice, video, and audio, when objective methods of subjective quality evaluation for multimedia signals become available.

Further, although the steps in FIG. 5 have been described as being implemented by a general-purpose processor, they may also be implemented by any available combination of hardware and software. For example, one or more of the software-implemented blocks 310–390 may be implemented in an application specific integrated circuit (ASIC) or field programmable gate array (FPGA).

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method of automatically determining a subjective measure of quality of signals over a packet-switched network, comprising:
   transmitting input signals to a model of the packet-switched network to obtain transmittal input signals wherein the model of the packet-switched network includes a bursty loss model in which a start of a packet burst is determined according to a Bernoulli trial, and a burst length is Poisson distributed;
   altering the transmitted input signals using the model of the packet-switched network to obtain altered signals, the altered signals representing results of transmitting the transmitted input signals through the packet-switched network;
   modifying the altered signals to obtain output signals;
   measuring an objective quality of the output signals based on the input signals; and
   transforming the objective quality to the subjective measure of quality.

2. The method of claim 1, further comprising:
   storing the subjective measure of quality.

3. The method of claim 1, further comprising:
   setting parameters for the model of the packet-switched network.

4. The method of claim 1, wherein said transmitting includes:
   encoding the input signals to produce encoded signals,
   packetizing the encoded signals to produce packetized signals, and
   streaming the packetized signals to produce the transmitted input signals.

5. The method of claim 4, further comprising:
   setting parameters associated with one or more of said encoding, packetizing, and streaming.

6. The method of claim 1, wherein said modifying includes:
   playing out the altered signals to produce packetized signals;
   depacketizing the packetized signals to produce encoded signals, and
   decoding the encoded signals to produce the output signals.

7. The method of claim 1, wherein said transforming includes:
   mapping the objective quality to a mean opinion score, the mean opinion score being the subjective measure of quality.

8. The method of claim 1, wherein said input signals include audio signals.

9. The method of claim 1, wherein said input signals include video signals.

10. The method of claim 1, wherein said input signals include multimedia signals.

11. A method of automatically determining a subjective quality of voice signals transmitted over a packet-switched network, comprising:
    encoding and streaming input voice signals to obtain streamed input signals;
    perturbing the streamed input signals using a packet-switched network model to obtain perturbed voice signals wherein the packet-switched network model includes a bursty loss model in which a start of a packet burst is determined according to a Bernoulli trial, and a burst length is Poisson distributed;
    buffering and decoding the perturbed voice signals to obtain output voice signals; and
    automatically determining a subjective measure of quality of the output voice signals based on the input voice signals.

12. The method of claim 11, wherein the input voice signals include reference signals from the International Telecommunication Union (ITU).

13. The method of claim 11, wherein said encoding utilizes one of the group of coders/decoders (codecs) consisting of the International Telecommunication Union-Telecommunication section (ITU-T) G.711 standard and G.729 standard.

14. The method of claim 11, wherein the packet-switched network model further includes:
    a Bernoulli loss model, substituted for the bursty loss model, in which packets associated with the streamed input signals are discarded at random.

15. The method of claim 11, wherein said determining includes:
    calculating an objective measure of quality of the output voice signals based on the input voice signals, and
    mapping the objective measure of quality to a subjective measure of quality.

16. The method of claim 15, wherein said calculating includes:
    calculating the objective measure of quality of the output voice signals using a Perceptual Speech Quality Measure (PSQM) algorithm.

17. A computer-readable medium that stores instructions executable by one or more processors to perform a method for automatically determining a subjective quality of signals received over a packet-switched network, comprising:
    instructions for encoding an input signal to produce an encoded signal;
    instructions for packetizing the encoded signal to produce a packetized signal;
    instructions for streaming the packetized signal to produce a streamed signal;
    instructions for performing a discrete event simulation of the network on the streamed signal to produce an output signal wherein the packet-switched network simulation includes a bursty loss simulation in which a start of a packet burst is determined according to a Bernoulli trial and a burst length is Poisson distributed;
    instructions for buffering the output signal to produce a packetized output signal;
    instructions for depacketizing the packetized output signal to produce an encoded output signal;

instructions for decoding the encoded output signal to produce a received signal;

instructions for producing an objective quality measurement of the received signal using an objective quality measurement algorithm and the input signal; and instructions for transforming the objective quality measurement of the received signal into a subjective quality score for the received signal.

18. The computer-readable medium of claim 17, further comprising:
instructions for setting coder/decoder (codec) parameters within the instructions for encoding and the instructions for decoding.

19. The computer-readable medium of claim 17, further comprising:
instructions for setting packetizing parameters within the instructions for packetizing and the instructions for depacketizing.

20. The computer-readable medium of claim 17, further comprising:
instructions for setting network parameters and signal impairment parameters within the instructions for performing.

21. The computer-readable medium of claim 17, wherein the instructions for producing include an algorithm from the group consisting of: a Perceptual Speech Quality Measure (PSQM) algorithm, a Perceptual Audio Quality (PEAQ) algorithm, and a Perceptual Evaluation of Speech Quality (PESQ) algorithm.

22. The computer-readable medium of claim 17, wherein said input signal includes an audio signal.

23. The computer-readable medium of claim 17, wherein said input signal includes a video signal.

24. The computer-readable medium of claim 17, wherein said input signal includes a multimedia signal.

25. A computer-readable medium that stores instructions executable by one or more processors that constitute a simulation engine for automatically determining a subjective quality of signals received over a packet-switched network, comprising:
instructions for transmitting an input signal to a model of the network to obtain a transmitted signal;
instructions for perturbing the transmitted signal by the network model to obtain a perturbed signal wherein the network model includes a bursty loss model in which a start of a packet burst is determined according to a Bernoulli trial, and a burst length is Poisson distributed;
instructions for receiving the perturbed signal from the network model to obtain a received signal;
instructions for producing a subjective measure of quality from the received signal and the input signal; and
instructions for changing parameters in the instructions for transmitting, the instructions for perturbing, and the instructions for receiving.

26. The computer-readable medium of claim 25, further comprising:
instructions for repeating said instructions for transmitting, said instructions for perturbing, said instructions for receiving, said instructions for producing, and said instructions for changing parameters with different sets of network and signal parameters.

27. A device for automatically determining a subjective quality of audio signals received over a packet-switched network, comprising:
means for encoding, packetizing, and streaming input audio signals to obtain streamed input signals;
means for impairing the streamed input signals to obtain impaired audio signals wherein the impaired signals include bursty loss signals in which a start of a packet burst is determined according to a Bernoulli trial, and a burst length is Poisson distributed;
means for buffering, depacketizing, and decoding the impaired audio signals to obtain output audio signals; and
means for automatically determining a subjective measure of quality of the output audio signals based on the input audio signals.

28. A method of automatically determining a subjective measure of quality of signals over a packet-switched network, comprising:
transmitting input signals to a model of the packet-switched network to obtain transmittal input signals wherein the model of the packet-switched network includes a delay jitter model in which background traffic that arrives according to a Poisson process is interspersed with packets associated with the streamed input signals;
altering the transmitted input signals using the model of the packet-switched network to obtain altered signals, the altered signals representing results of transmitting the transmitted input signals through the packet-switched network;
modifying the altered signals to obtain output signals;
measuring an objective quality of the output signals based on the input signals; and
transforming the objective quality to the subjective measure of quality.

29. A method of automatically determining a subjective quality of voice signals transmitted over a packet-switched network, comprising:
encoding and streaming input voice signals to obtain streamed input signals;
perturbing the streamed input signals using a packet-switched network model to obtain perturbed voice signals wherein the packet-switched network model includes a delay jitter model in which background traffic that arrives according to a Poisson process is interspersed with packets associated with the streamed input signals;
buffering and decoding the perturbed voice signals to obtain output voice signals; and
automatically determining a subjective measure of quality of the output voice signals based on the input voice signals.

30. A computer-readable medium that stores instructions executable by one or more processors to perform a method for automatically determining a subjective quality of signals received over a packet-switched network, comprising:
instructions for encoding an input signal to produce an encoded signal;
instructions for packetizing the encoded signal to produce a packetized signal;
instructions for streaming the packetized signal to produce a streamed signal;
instructions for performing a discrete event simulation of the network on the streamed signal to produce an output signal wherein the packet-switched network simulation includes a delay jitter simulation in which background traffic that arrives according to a Poisson process is interspersed with packets associated with the streamed input signals;
instructions for buffering the output signal to produce a packetized output signal;

instructions for depacketizing the packetized output signal to produce an encoded output signal;

instructions for decoding the encoded output signal to produce a received signal;

instructions for producing an objective quality measurement of the received signal using an objective quality measurement algorithm and the input signal; and instructions for transforming the objective quality measurement of the received signal into a subjective quality score for the received signal.

31. A computer-readable medium that stores instructions executable by one or more processors that constitute a simulation engine for automatically determining a subjective quality of signals received over a packet-switched network, comprising:

instructions for transmitting an input signal to a model of the network to obtain a transmitted signal;

instructions for perturbing the transmitted signal by the network model to obtain a perturbed signal wherein the network model includes a delay jitter model in which background traffic that arrives according to a Poisson process is interspersed with packets associated with the streamed input signals;

instructions for receiving the perturbed signal from the network model to obtain a received signal;

instructions for producing a subjective measure of quality from the received signal and the input signal; and instructions for changing parameters in the instructions for transmitting, the instructions for perturbing, and the instructions for receiving.

32. A device for automatically determining a subjective quality of audio signals received over a packet-switched network, comprising:

means for encoding, packetizing, and streaming input audio signals to obtain streamed input signals;

means for impairing the streamed input signals to obtain impaired audio signals wherein the impaired signals include delay jitter signals in which background traffic that arrives according to a Poisson process is interspersed with packets associated with the streamed input signals;

means for buffering, depacketizing, and decoding the impaired audio signals to obtain output audio signals; and means for automatically determining a subjective measure of quality of the output audio signals based on the input audio signals.

* * * * *